United States Patent [19]

VanBuskirk et al.

[11] Patent Number: 5,464,459
[45] Date of Patent: Nov. 7, 1995

[54] CHEVRON TYPE MIST ELIMINATOR AND SYSTEM

[75] Inventors: Gregory K. VanBuskirk, Wichita, Kans.; Chang-Li Hsieh, Carlisle, Mass.; Kenneth J. McNulty, Atkinson, N.H.; Ole V. Hansen, Wichita, Kans.

[73] Assignee: Koch Engineering Company, Inc., Wichita, Kans.

[21] Appl. No.: 254,373

[22] Filed: Jun. 6, 1994

[51] Int. Cl.⁶ .................................................. B01D 45/08
[52] U.S. Cl. ........................ 55/257.2; 55/257.3; 55/440; 55/443
[58] Field of Search ........................... 55/257.2, 440, 55/442, 443, 257.3, 257.5

[56]  References Cited

U.S. PATENT DOCUMENTS

| | | | |
|---|---|---|---|
| 3,748,832 | 7/1973 | Furlong et al. | 55/257.2 |
| 3,757,498 | 9/1973 | Hurlbut et al. | 55/440 |
| 4,157,250 | 6/1979 | Regehr et al. | 55/257.3 X |
| 4,557,740 | 12/1985 | Smith | 55/440 |
| 4,601,731 | 7/1986 | Michelson | 55/440 X |
| 4,968,328 | 11/1990 | Duke | 55/440 X |
| 4,975,101 | 12/1990 | Swanborn | 55/440 |
| 5,203,894 | 4/1993 | Chowaniec | 55/440 |
| 5,268,011 | 12/1993 | Wurz | 55/257.2 |
| 5,269,823 | 12/1993 | Wurz | 55/443 X |

OTHER PUBLICATIONS

Munters Corporation, "8800 CM/1193/2000", 8800 Series, Vertical Flow Mist Eliminators ©1993.

*Primary Examiner*—Richard L. Chiesa
*Attorney, Agent, or Firm*—Richard P. Crowley

[57]  ABSTRACT

A mist eliminator for removing liquid droplets from a gas stream, which includes a plurality of impingement baffles, the baffles having a profile including a short inlet section, a lower angled section, a short interconnecting section, an upper angled section, and a short outlet section, the length of the lower angled section longer than the upper angled section, the upper angled section having a greater angular inclination than the lower angled section, thereby providing for a mist eliminator for use in a gas.-liquid contact column of higher gas throughput, low pressure drop, moderate removal efficiency, and low manufacturing cost, which is easily cleaned, and particularly adapted for wet scrubbing processes.

13 Claims, 1 Drawing Sheet

CHEVRON TYPE MIST ELIMINATOR AND SYSTEM

BACKGROUND OF THE INVENTION

Mist eliminators are typically employed to remove liquid mist or liquid particles from a gas stream in which liquid has been suspended or entrained. Mist eliminators may be employed in a wide variety of devices where there are gas-liquid contacts and are particularly used for the cleaning of waste or flue gas streams in a wet scrubber or other applications. In such processes, mist eliminator devices are provided in one or more layers across a gas-liquid contacting column or duct to remove the mist from the gas to provide a mist-lean gas stream from a mist-rich gas stream.

Mist eliminators may comprise a wide variety of different structures; however, one very popular type of mist eliminator comprises a baffle-type or chevron-type mist eliminator which is arranged in one or more layers and provides for a zigzag or a tortuous flow path through the generally parallel, spaced-apart, mist eliminator baffles, with the baffles generally having an upstream edge and a downstream edge and arranged horizontally within the gas-liquid column or chamber, although they may assume other sloped positions, and vertical positions.

These baffle-type mist eliminators are designed so that the liquid droplets may be collected and not re-entrained during the passage through the mist eliminator, so that the design of the proper mist eliminator is a function of a number of variables, such as, but not limited to, the design and geometry of the gas flow path through the mist eliminator, the nature of the gas stream, temperatures, velocities and amount and droplet size of the liquid.

One illustrated example of a chevron-type mist eliminator and method is described, for example, in U.S. Pat. No. 4,601,731, issued Jul. 22, 1986. This mist eliminator, as described, is employed in a gas-liquid column with a layer composed of a plurality of parallel, spaced-apart serpentine baffles, extending across the upwardly flowing gas path, defining therebetween a plurality of tortuous gas flow paths. The baffles are presented substantially angularly to the axis of the column and have surfaces for the impingement of the upwardly flowing mist-rich gas stream to provide for liquid collection, and includes downwardly projecting drainage points on the leading edge of the baffles to promote the rapid drainage of the baffles. The chevron-type baffles employed provide for a change in direction of the gas flow path at an angle of about 45°, generally at least four times in each mist eliminator layer.

It is desirable to provide for a new and improved chevron or baffle-type mist eliminator-system containing such mist eliminators and a method of removing liquids in gas-rich streams, particularly where higher gas throughputs are desired to pass through the mist-eliminator device before collected liquid is re-entrained in the gas stream, such as, but not limited to, wet scrubbing process towers of large diameter.

SUMMARY OF THE INVENTION

The invention relates to a baffle-type mist eliminator and system containing one or more layers of baffle-type mist eliminators, and a method for removing liquid mist or liquid droplets from a gas stream.

The invention is directed to a mist eliminator device for removing liquid droplets from a liquid-rich gas stream, and which mist eliminator comprises a plurality of generally spaced-apart, generally aligned, parallel impingement type baffles or blades, which normally extend generally across the cross sectional area of the liquid rich gas stream flow area to form at least one layer therein and to provide between the respective pairs of impinging baffles a non-linear or tortuous gas flow path for the liquid-rich gas stream passing therebetween. A mist eliminator impingement blade includes a short, straight, axially aligned inlet section having a lower leader edge, and a lower angled section, a short, straight, axially aligned interconnecting section, an upper angled section, and a short, straight, axially aligned outlet section having an outlet edge. The mist eliminator blade includes an upper angled section having a greater angular inclination from the axis of the device than the lower angled section. For example, the inclined angle of the lower section is about 30° from the vertical axis, while the inclined angle of the upper section is about 45°, (e.g. +5%) from the vertical axis, whereby the lower angled section provides improved drainage of collected liquid from the liquid-rich gas stream, and the connecting section provides reduced pressure drop without substantial re-entrainment of the collected liquid.

The mist eliminator includes an interconnecting straight line section which has a length ranging from about 5 to 55% of the length of the lower angular section of the mist eliminator, wherein the upper angular section has a length of less than generally 80%, for example, 60%, of the length of the lower angular section, and wherein the impingement baffles of the mist eliminator are generally spaced apart in one or more layers of about 0.5 to 5 inches, for example, and preferably from about 1½ to 2½ inches, for example, in a wet scrubbing process. Mist eliminators of the invention generally have a straight inlet and a straight outlet. The interconnecting sections and outlet preferably are about the same length, and preferably are aligned with the axis of the column. Mist eliminators of the invention are employed in one or two or more layers, generally extending horizontally substantially across the cross-section of a gas-liquid column, such as a wet scrubbing process column or the like.

While the various sections of the mist eliminator of the invention may vary in length, the five section mist eliminator of the invention, in one preferred embodiment, should be spaced apart from 0.5 to 3 inches, have an inlet length of ¼ to 1 inch, a lower angular section length of 3 to 8 inches, an interconnecting section length of 1 to 1½ inches, an upper angle section length of 3 to 4 inches, and a straight outlet section of 1 to 1½ inches. The mist eliminator so designed provides for high re-entrainment velocity, that is, a re-entrainment velocity of greater than about 19–20 feet per second, and provides for a low pressure drop in comparison to a similar baffle-type arrangement with the same performance efficiency.

The mist eliminator of the invention provides for substantially straight, linear segments that are comprised of the blade or baffle profile in combination with a relatively small inclination from the vertical for the inlet pass and a relatively larger inclination from the vertical of the outlet pass; that is, between the inlet and the outlet straight linear segments. (The combination of the impingement baffle or blade profile in the mist eliminator and the resulting tortuous flow channel developed by the overlap of the successive blade profile permits a higher gas throughput before collected liquid moisture is re-entrained in the gas stream). The profile of the mist eliminator of the invention provides for a steeper inlet pass which causes better drainage of collected liquid from the surface of the baffle, also the employment of a vertical flat linear segment between the pair of inclined, angular impinging baffles of the mist eliminator greatly reduces the pressure drop relative to any type of chevron-type mist eliminator without such single vertically extending segments. The mist eliminator of the invention as employed offers high capacity, low pressure drop and moderate mist removal efficiency. The open, less complicated impingement baffle profile provides for the easy cleaning of the mist eliminator in use and is particularly desirable for wet scrubbing processes. As desired and preferably, the lower leading edge of the straight line inlet section may be serrated or otherwise treated or notched to provide for improved drainage of the collected liquid from the lower leading edge. It has been found that there is a relationship between the overlap of the inlet section with the adjacent interconnecting section which is important to capacity and the outlet section and the adjacent interconnecting section which is also, but less, important to the capacity of the mist eliminator. The baffles are arranged in a selected preferred overlap relationship. If a plane is drawn from the straight inlet section of one baffle, it will intersect both angled upper and lower sections of the next spaced-apart baffle.

The distance between this inlet plane and the plane of the straight, interconnecting section of the spaced-apart adjacent baffle is a measure of baffle inlet overlap. It is preferred that the baffle be positioned with a spacing of baffle inlet overlap of between 10 and 50% of the distance between the respective planes.

Also, it is preferred that the baffle outlet overlap be positioned between about 10 and 150% of the distance between the outlet plane and the plane of the interconnecting section of the spaced-apart adjacent baffle.

The invention will be described for the purposes of illustration only in connection with certain illustrated embodiments; however, it is recognized that various improvements, additions, modifications and changes may be made to the illustrated embodiments, all falling within the spirit and scope of the invention.

DESCRIPTION OF THE PREFERRED EMBODIMENTS

Figure 1:
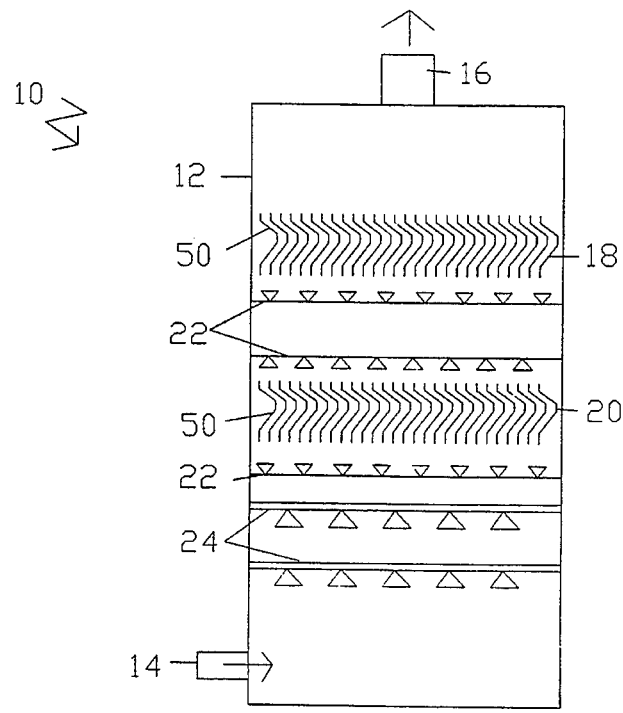
FIG. 1 is an illustrated schematic drawing of a wet scrubber column showing a cross section of the mist eliminator of the invention.

FIG. 1 is a schematic, sectional illustration of a mist eliminator system 10 employed in a wet scrubbing process in a column 12 having an inlet 14 for the introduction of a flue gas containing, for example, sulfur dioxide to be scrubbed, and an outlet 16 for the removal of a mist-lean cleaned or scrubbed flue gas. The column 16 includes a fist stage layer 20 of a plurality of impingement baffles 50 (see FIG. 2) and a vertical, spaced-apart second stage layer 18 of a plurality of impingement baffles 50. The layers 18 and 20 are illustrated as the same as in a preferred embodiment; however, it is recognized that the first or second stage layers 18 and 20 or even other mist eliminator layers may be used and be different, provided that at least one layer comprises or includes the mist eliminator 50 of the invention. A water wash system comprising pipes and spray nozzles 22 below the second stage layer 18 and above and below the first stage layer 20 is used to wash the mist eliminators 50. A reagent solution or water slurry system such as of lime, limestone, ammonium sulfate, or other reagents, with nozzles 24 is used to scrub the upwardly flowing flue gas, to remove sulfur dioxide or other gaseous contaminants from the flue gas.

Figure 2:
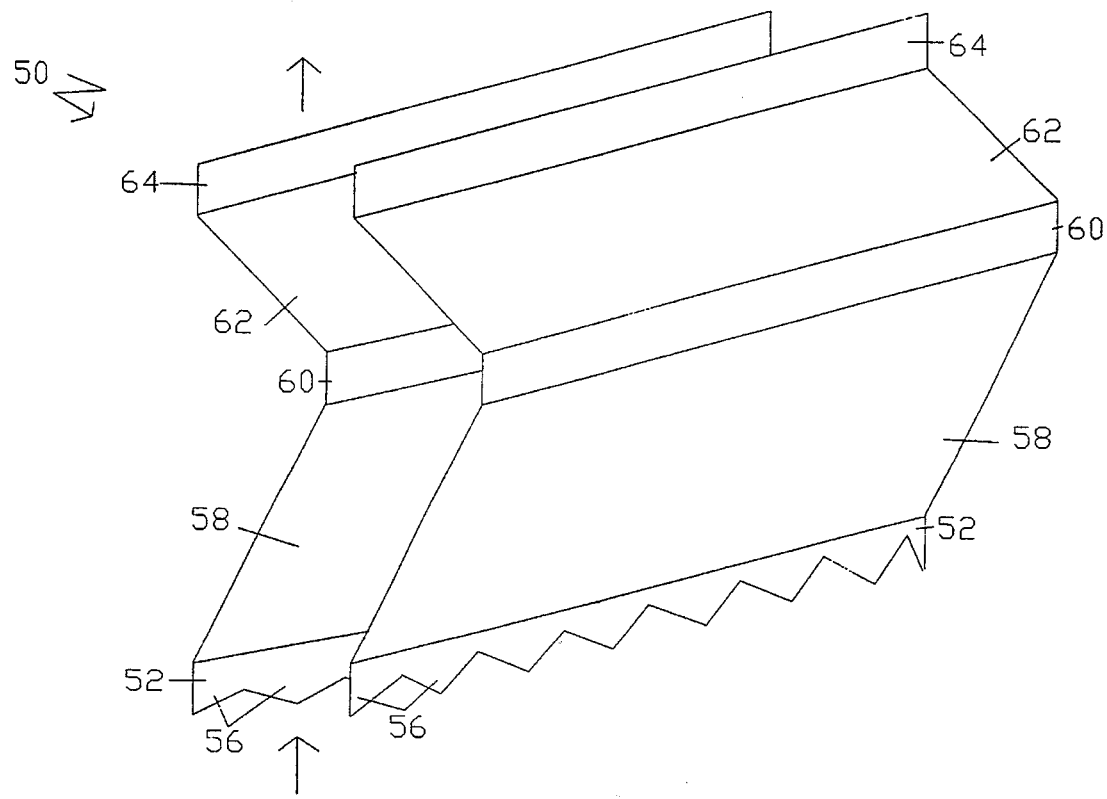
FIG. 2 is an enlarged perspective view of a pair of blades of the mist eliminators shown in FIG. 1.

FIG. 2 is an enlarged perspective view illustration of a pair of aligned, spaced-apart mist eliminator blades 50 used in FIG. 1 with each of the mist eliminators 50 having a straight baffle inlet section 52 having a leading edge which may have drainage teeth 56 to promote liquid drainage of collected liquid.

The mist eliminator 50 includes an elongated, lower (angularly inclined by 30° from the vertical axis of the column 10) baffle section 58, a short, straight, axially positioned interconnecting baffle section 60, an upper angular (inclined by 45° from the vertical axis of the column 10) baffle section 62, which section 60 is shorter in length than lower section 58 and an upper, straight outlet baffle section 64 which, as illustrated, is about the same length as the inlet section 52. The lower section, with its lower inclined angle, permits the removal of large liquid (water) droplets in the upwardly flowing scrubbed flue gas stream, while the interconnecting section 60 promotes a low or reduced pressure drop, while the upper, more inclined section 62 promotes the removal by impaction of finer sized liquid mist particles. The parallel, spaced-apart pair of mist eliminators 50 as illustrated, provides a tortuous flue gas flow path between the blades for impingement of the mist-liquid droplet rich flue gas against the baffle sections of the mist eliminator.

The simpler profile design permits high gas throughput, easy manufacture, and permits easy cleaning of the mist eliminator. The combination of its natural features provide for high capacity, low pressure drop, and good efficiency in mist removal.

What is claimed is:

1. A mist eliminator for removing liquid droplets from a liquid-rich gas stream, said mist eliminator comprising:

a) a plurality of spaced-apart, substantially aligned, substantially parallel, impingement baffles extending substantially across the cross-sectional area of an apparatus through which a liquid-rich gas stream is passing to form a layer and to provide a substantially tortuous flow path for the liquid-rich gas stream passing through adjacent pairs of the impingement baffles of the mist eliminator;

b) each impingement baffle having a short, straight, axially aligned inlet section with a lower leading edge, a lower angled section extending from the inlet section, a short, straight, axially aligned, interconnecting section extending from the lower angled section, an upper angled section extending from the interconnecting section, and a short, straight, axially aligned outlet section having an outlet leading edge with the length of the lower angled section longer than the length of the upper angled section; and c) the upper angled section having a greater angular inclination from the axis of the apparatus than the lower angled section, whereby the mist eliminator provides for improved drainage of collected liquid from the mist eliminator, and the interconnecting section provides a reduced pressure drop with a high liquid-gas stream throughput.

2. The mist eliminator of claim 1 wherein the lower section has an inclined angle of about 30° from the axis of the apparatus.

3. The apparatus of claim 1 wherein the upper section has an inclined angle of about 45° from the axis of the apparatus.

4. The mist eliminator of claim 1 wherein the lower section has an inclined angle of about 30° from the axis of the apparatus and the upper section has an inclined angle of about 45° from the axis of the apparatus.

5. The mist eliminator of claim 1 wherein the interconnecting section has a length of about 5 to 55% of the length of the lower angular section.

6. The mist eliminator of claim 1 wherein the upper angular section has a length of less than about 80% of the length of the lower angular section.

7. The mist eliminator of claim 1 wherein the mist eliminator blades are spaced apart from about 0.5 to 5 inches.

8. The mist eliminator of claim 1 wherein the inlet, outlet and interconnecting sections are all about the same linear length.

9. The mist eliminator of claim 1 wherein the inlet section has a length of ¼ to 1 inch and the lower angular section has a length of 3 to 8 inches, and the interconnecting section has a length of 1 to 1½ inches, and the upper angular section has a length of 3 to 4 inches, and the outlet section has a length of 1 to 1½ inches; and wherein the impingement baffles are spaced apart from about 1 to 3 inches.

10. The mist eliminator of claim 1 wherein the baffles are positioned apart in an overlap relationship a distance of between about 10 to 50% of the distance between the inlet section plane and the intersecting section plane of the next adjacent baffle.

11. The mist eliminator of claim 1 Wherein the baffles are positioned apart in an overlap relationship a distance of between 10 to 150% of the distance between the outlet section plane and the interconnecting section plane of the next adjacent baffle.

12. A gas-liquid column which includes an inlet for the introduction of an upwardly flowing gas, an outlet in the upper section of the column for the removal of a mist-lean gas stream, at least one layer of mist eliminators of claim 1 extending substantially across the cross section of the column and liquid means within the column to contact the upwardly moving gas stream and to provide a liquid-rich gas stream and with the mist eliminators employed in a layer above the upwardly flowing liquid-rich gas stream.

13. The gas-liquid exchange column of claim 12 which includes first and second layers of a mist eliminator which are spaced apart and extend substantially across the cross section area of the column which includes a liquid wash system and a gas flue inlet in the lower section of the column for the introduction of a flue-gas to be scrubbed in a liquid wash system which includes scrubbing agents to contact the flue gas and an outlet in the upper section of the column for the removal of a mist-lean, clean flue gas.

* * * * *